P. BERGEN.
Corn Sheller.
No. 19,809. Patented March 30, 1858.
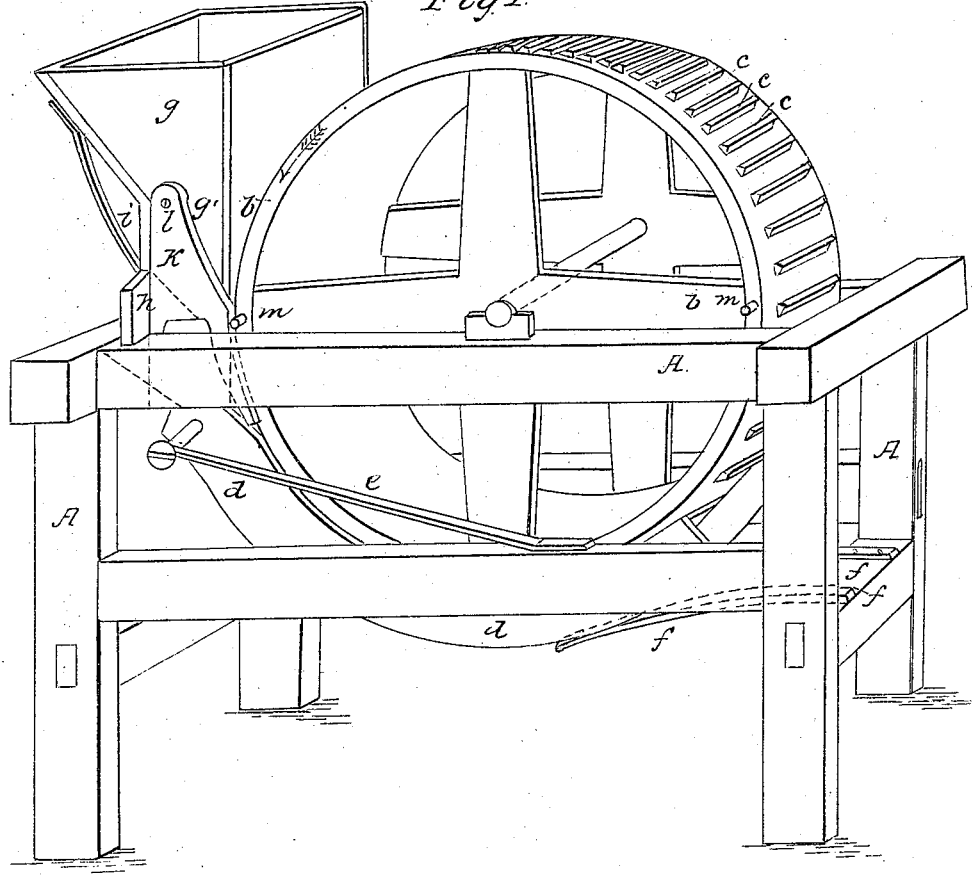

UNITED STATES PATENT OFFICE.

PETER BERGEN, OF NEW YORK, N. Y., ASSIGNOR TO JANE ANN BERGEN, OF SAME PLACE.

CORN-SHELLER.

Specification of Letters Patent No. 19,809, dated March 30, 1858.

*To all whom it may concern:*

Be it known that I, PETER BERGEN, of the city, county, and State of New York, have invented certain new and useful Improvements in Machines for Shelling Indian Corn; and I do hereby declare that the following is a full, clear, and exact description thereof, reference being made to the annexed drawings, making a part of this specification, in which—

Figure 1 is a perspective view of my machine, Fig. 2 is a perspective view of the hopper and of the parts which operate said hopper, and similar letters indicate similar parts in both the figures.

My invention is an improvement in that kind of corn shellers wherein the corn is to be taken off the cob by having the ear passed between the face of a cylinder armed with teeth or projections, and a cradle or concave similarly armed, and it consists in so constructing the feeding hopper and the cradle, and so connecting them with the shelling cylinder, that but one ear of corn will be receiving the action of the shelling parts at the same time, and that those parts shall be able to adapt themselves at all times to the irregularities of form and of taper of the ear that is passing through, whereby the corn can be more thoroughly as well as more rapidly taken off.

The construction is as follows: Upon a suitable frame A, I mount a cylinder of cast iron $b$, the face of which is either covered with teeth or has projecting ribs upon it as shown at $c$ the space occupied by these teeth or ribs being equal in width to the length of any ear of corn that is to be operated upon. Below this cylinder I place a cradle or concave $d$, which is a segment of a circle, and the bottom of which is either a solid bed having ribs or teeth upon its inner surface, as described for the cylinder, or, as I prefer to make it, having its shelling surface composed of bars of hard wood or metal placed at say about three quarters of an inch apart, and extending at right angles across from side to side. This cradle is supported at its upper end upon two long springs, one of which is seen at $e$, and at its lower end by two other springs $f$, there being thus one to support each corner, and they act to hold the cradle up toward or against the cylinder $b$. The upper end of the cradle is set so as to come up to the frame A, as shown, and above this I place a hopper $g$. This hopper is made of sufficient length to take in the longest ears of corn horizontally, and, as seen in the drawing, it is made wide at the top in order that the ears may be readily thrown into it, but at the lower part, $g'$, it is made narrow—say about three inches in width, and the bottom of this is closed by an inclined flap board $h$ which is hinged on at its upper edge as shown in Fig. 2, so that it will come when closed, near enough to the front to prevent an ear from passing out. This flap is kept pressed into a closed position by the spring $i$, and it is opened, when required, by a piece of iron or hard-wood shaped as shown at $k$, centered on the side of the hopper at $l$, and so placed that it can be moved upon that center to press upon and open off the flap $h$ when a feed is required. This is done by a pin $m$ projecting from the side of the cylinder so as to take against the piece $k$ when that is in the position shown in Fig. 2, wherein the flap is seen closed, and to move it into the position seen in Fig. 1, the flap being therein open.

The operation of my machine will be that by the construction above described only one ear of corn will fall at a time into the space between the cylinder and the cradle, because the pins $m$ are to be placed so far apart on the cylinder that a second one will not strike the piece $k$ until the ear of corn last fed in has passed out of the cradle. The whole action of the machine is therefore upon that one ear, and the four springs which support the cradle are always acting to keep the said cradle in a proper position to adapt itself to the taper and other irregularities of form of each different ear. The grains are thus certain of being all shelled off, even though the ears are thrown into the hopper with their points at either side of it, as in the hasty feeding necessary for this kind of machines they are likely to be.

I claim—

The combination of the delivery flap or bottom $h$ of the hopper, the piece $k$, the pins $m$ on the shelling cylinder, the cradle $d$, and the springs $e$ and $f$, when these several parts are constructed and relatively arranged as described, to operate in the manner and for the purposes substantially as set forth.

PETER BERGEN.

Witnesses:
JOHN P. MORRIS,
JAMES W. WILSON.